United States Patent
Inoue et al.

(10) Patent No.: US 10,604,629 B2
(45) Date of Patent: Mar. 31, 2020

(54) POLYAMIDE ACID COMPOSITION AND POLYIMIDE COMPOSITION

(71) Applicant: JFE CHEMICAL CORPORATION, Tokyo (JP)

(72) Inventors: Youhei Inoue, Chiba (JP); Hiroaki Mori, Chiba (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 96 days.

(21) Appl. No.: 15/567,311

(22) PCT Filed: Apr. 11, 2016

(86) PCT No.: PCT/JP2016/001966
§ 371 (c)(1),
(2) Date: Oct. 17, 2017

(87) PCT Pub. No.: WO2016/166961
PCT Pub. Date: Oct. 20, 2016

(65) Prior Publication Data
US 2018/0105648 A1    Apr. 19, 2018

(30) Foreign Application Priority Data
Apr. 17, 2015    (JP) .................................. 2015-085051

(51) Int. Cl.
*C08G 73/10*    (2006.01)

(52) U.S. Cl.
CPC ..... *C08G 73/1067* (2013.01); *C08G 73/1007* (2013.01); *C08G 73/1042* (2013.01); *C08G 73/1057* (2013.01)

(58) Field of Classification Search
CPC ............. C09J 2479/08; C08G 73/1067; C08G 73/1042; C08L 79/08
See application file for complete search history.

(56) References Cited

U.S. PATENT DOCUMENTS

2007/0149758 A1    6/2007    Wang et al.

FOREIGN PATENT DOCUMENTS

| JP | S61-143434 A | 7/1986 |
|---|---|---|
| JP | H01-98628 A | 4/1989 |
| JP | 2000-356777 A | 12/2000 |
| JP | 36-10999 B2 | 1/2005 |
| JP | 3687044 B2 | 8/2005 |
| JP | 2007-190692 A | 8/2007 |
| JP | 2008-291265 A | 12/2008 |
| JP | 2009-138066 A | 6/2009 |
| JP | 2010-125793 A | 6/2010 |
| JP | 2010-250307 A | 11/2010 |
| JP | 2011-013602 A | 1/2011 |
| JP | 2012-76278 A | 4/2012 |
| JP | 2012-102155 A | 5/2012 |
| JP | 2014-9305 A | 1/2014 |
| JP | 2014-55302 A | 3/2014 |
| JP | 5468575 B2 | 4/2014 |
| JP | WO 2014129464  * | 8/2014 |
| JP | 60-42817 B2 | 12/2016 |
| TW | 201500207 A | 1/2015 |
| WO | 2005/066242 A1 | 7/2005 |
| WO | 2005/084948 A1 | 9/2005 |
| WO | 2014/129464 A1 | 8/2014 |
| WO | 2014/208644 A1 | 12/2014 |

OTHER PUBLICATIONS

Dec. 27, 2016 Office Action issued in Taiwainese Patent Application No. 105111565.
May 31, 2016 International Search Report issued in Patent Application No. PCT/JP2016/001966.
Feb. 28, 2018 Extended European Search Report issued in European Patent Application No. 16779758.8.
Jun. 4, 2019 Office Action issued in Chinese Application No. 201680022169.4.
Sep. 6, 2019 Office Action issued in European Application No. 16 779 758.8.
Jan. 16, 2020 Office Action issued in Chinese Patent Application No. 201680022169.4.

* cited by examiner

*Primary Examiner* — Gregory Listvoyb
(74) *Attorney, Agent, or Firm* — Oliff PLC

(57) ABSTRACT

A polyamide acid composition and a polyimide composition are obtained from a tetracarboxylic acid compound containing an aromatic tetracarboxylic acid compound having a naphthalene skeleton and a diamine compound containing an aromatic diamine compound having a biphenyl skeleton.

11 Claims, No Drawings

POLYAMIDE ACID COMPOSITION AND POLYIMIDE COMPOSITION

TECHNICAL FIELD

The present disclosure relates to polyamide acid compositions and polyimide compositions. More particularly, the present disclosure relates to polyamide acid compositions and polyimide compositions that are obtained from tetracarboxylic acid compounds including an aromatic tetracarboxylic acid compound having a naphthalene skeleton and diamine compounds including an aromatic diamine compound having a biphenyl skeleton.

BACKGROUND ART

Aromatic polyimides obtained by polymerization of aromatic tetracarboxylic acid compounds and aromatic diamine compounds are excellent in mechanical strength, heat resistance, electrical insulating properties, chemical resistance, dimensional stability, etc. and are widely used particularly for electronic device materials.

In recent years, applications of aromatic polyimides to semiconductor materials and thin-film solar cell materials are growing. Substrate materials such as silicon used for these materials have low thermal expansivity, and high-temperature treatment such as sputtering is required in the production processes of these materials.

Therefore, polyidmides used for the above purposes are required to have higher dimensional stability and heat resistance than conventional polyimides. Specifically, the thermal expansion coefficient, which is a measure of dimensional stability, of these polyimides must be 10 ppm/° C. or lower, and their thermal decomposition temperature, which is a measure of heat resistance, must be 600° C. or higher.

However, aromatic polyimides have poor solubility in solvent because of their rigid molecular structure and strong interaction of imide bonds providing linkages in the molecular structure. To form an aromatic polyimide into a shape, a polyamide acid varnish that is a precursor of the polyimide must be used. Hence good solubility of polyamide acid or polyamide acid composition in solvent is required about the polyamide acid varnish (hereinafter solubility of polyamide acid or polyamide acid composition in solvent is referred to as varnish solubility).

Examples of the conventional polyimides used widely include: two-component polyimides such as pyromellitic acid dianhydride (PMDA)-4,4'-diaminodiphenyl ether (ODA)-based polyimides shown in Patent Literature 1; and 3,3',4,4'-biphenyltetracarboxylic acid dianhydride (sBPDA)-p-phenylenediamine (PDA)-based polyimides shown in Patent Literature 2. However, the thermal decomposition temperature of the PMDA-ODA-based polyimides is lower than 600° C., and their thermal expansion coefficient is high, about 40 ppm/° C. The heat resistance of the eBPDA-PDA-based polyimides is higher than that of the PMDA-ODA-based polyimides, and the thermal expansion coefficient of the sBPDA-PDA-based polyimides is lower than that of the PMDA-ODA-based polyimides. However, these do not meet the characteristics required for the above-described purposes.

Many three- and four-component polyimides prepared by copolymerization of the above-described monomers at given ratios have been proposed in, for example, Patent Literature 3. However, these polyimides tend to have lower heat resistance and a higher thermal expansion coefficient than the sBPDA-PDA-based polyimides.

Attempts to obtain polyimides having a low thermal expansion coefficient and high heat resistance are also shown in Patent Literature 4 to Patent Literature 10.

The polyimide described in Patent Literature 4 is obtained by using 2,3,6,7-naphthalenetetracarboxylic acid dianhydride (NTCDA) and an aromatic diamine component having a specific structure.

Patent Literature 5 uses, as a polyimide precursor that forms a polyimide having a 5% thermal weight loss temperature of 500° C. or higher, a compound obtained by reacting specified total diamines and specified total tetracarboxylic acid dianhydrides including NTCDA.

The polyimide described in Patent Literature 6 uses a specific aromatic diamine as a diamine component.

The polyimide described and used in Patent Literature 7 is obtained by polymerization of a specific acid dianhydride component including NTCDA and specific diamine components including p-phenylenediamine (PDA).

The polyimide described and used in Patent Literature 8 is obtained by causing a reaction between a specific aromatic diamine including PDA and a specific aromatic tetracarboxylic acid dianhydride including NTCDA.

The polyimide described and used in Patent Literature 9 is derived from a specific aromatic dianhydride including 3,3',4,4'-biphenyltetracarboxylic acid dianhydride (sBPDA) and a specific aromatic diamine including 2,2'-bis(triflurom-ethyl)benzidine (TFMB).

The polyimide described and used in Patent Literature 10 is obtained by polymerization of diamine components including PDA and TFMB and an acid component including sBPDA.

However, the polyimides described in Patent Literature 4 to Patent Literature 10 cannot meet the above-described requirement on the dimensional stability (thermal expansion coefficient: 10 ppm/° C. or lower), the requirement on the heat resistance (thermal decomposition temperature: 600° C. or higher), and the requirement on the varnish solubility.

CITATION LIST

Patent Literature

PTL 1: Japanese Examined Patent Application Publication No. 60-42817
PTL 2: Japanese Examined Patent Application Publication No. 36-10999
PTL 3: Japanese Patent No. 3687044
PTL 4: Japanese Unexamined Patent Application Publication No. 2012-102155
PTL 5: Japanese Unexamined Patent Application Publication No. 2014-9305
PTL 6: Domestic Re-publication of PCT International Publication for Patent Application No. 2005/084948
PTL 7: Japanese Unexamined Patent Application Publication No. 2010-125793
PTL 8: Japanese Unexamined Patent Application Publication No. 2007-190692
PTL 9: Japanese Unexamined Patent Application Publication No. 2014-55302
PTL 10: Japanese Patent No. 5468575

SUMMARY

Technical Problem

An object of the present disclosure is to provide a polyimide composition having a low thermal expansion coefficient and high heat resistance and obtained from a polyamide acid having excellent varnish solubility.

Solution to Problem

To achieve the above object, 2,3,6,7-naphthalenetetracarboxylic acid dianhydride (hereinafter may be referred to as NTCDA) used as a tetracarboxylic acid compound is introduced by copolymerization for the purpose of reducing the thermal expansion coefficient of the polyimide, improving its heat resistance, and allowing the polyamide acid to have good varnish solubility.

To achieve the above object, the present inventors have conducted extensive studies and found that, by introducing NTCDA as a tetracarboxylic acid compound for the polyimide and introducing p-phenylenediamine (hereinafter may be referred to as PDA) and at least one of o-tolidine (hereinafter may be referred to as OT) and 2,2'-bis(trifluoromethyl)benzidine (hereinafter may be referred to as TFMB) as an aromatic diamine component at a specific ratio, the reduction in thermal expansion coefficient of the polyimide and the improvement in its heat resistance (the improvement in thermal decomposition temperature) can be achieved while the varnish solubility of the polyamide acid is maintained.

(1) A polyamide acid composition comprising a polyamide acid obtained by polymerization of a tetracarboxylic acid compound containing 2,3,6,7-naphthalenetetracarboxylic acid dianhydride and a diamine compound containing 95 to 75 mol % of p-phenylenediamine and 5 to 25 mol of o-tolidine and/or 2,2'-bis(trifluoromethyl)benzidine.

(2) The polyamide acid composition according to (1), wherein the tetracarboxylic acid compound contains less than 100 mol % and 50 mol % or more of the 2,3,6,7-naphthalenetetracarboxylic acid dianhydride and 50 mol % or less and more than 0 mol % of 3,3',4,4'-biphenyltetracarboxylic acid dianhydride.

(3) A polyamide acid obtained by polymerization of a tetracarboxylic acid compound containing 2,3,6,7-naphthalenetetracarboxylic acid dianhydride and a diamine compound containing 95 to 75 mol % of p-phenylenediamine and 5 to 25 mol % of o-tolidine and/or 2,2'-bis(trifluoromethyl)benzidine.

(4) The polyamide acid according to (3), wherein the tetracarboxylic acid compound contains less than 100 mot % and 50 mol % or more of the 2,3,6,7-naphthalenetetracarboxylic acid dianhydride and 50 mol % or less and more than 0 mol % of 3,3',4,4'-biphenyltetracarboxylic acid dianhydride.

(5) A polyimide composition comprising a polyimide obtained by polymerization of a tetracarboxylic acid compound containing 2,3,6,7-naphthalenetetracarboxylic acid dianhydride and a diamine compound containing 95 to 75 mol of p-phenylenediamine and 5 to 25 mol % of o-tolidine and/or 2,2'-bis(trifluoromethyl)benzidine (6) The polyimide composition according to (5), wherein the tetracarboxylic acid compound contains less than 100 mol % and 50 mol % or more of the 2,3,6,7-naphthalenetetracarboxylic acid dianhydride and 50 mol % or less and more than 0 mol % of 3,3',4,4'-biphenyltetracarboxylic acid dianhydride.

(7) A polyimide obtained by polymerization of a tetracarboxylic acid compound containing 2,3,6,7-naphthalenetetracarboxylic acid dianhydride and a diamine compound containing 95 to 75 mol % of p-phenylenediamine and 5 to 25 mol % of o-tolidine and/or 2,2'-bis(trifluoromethyl)benzidine.

(8) The polyimide according to (7), wherein the tetracarboxylic acid compound contains less than 100 mol % and 50 mol % or more of the 2,3,6,7-naphthalenetetracarboxylic acid dianhydride and 50 mol % or less and more than 0 mol % of 3,3',4,4'-biphenyltetracarboxylic acid dianhydride.

(9) The polyimide according to (7) or (8), wherein the polyimide has a thermal expansion coefficient of 10 ppm/° C. or less.

(10) The polyimide according to any of (7) to (9), wherein the polyimide has a 5% thermal weight loss temperature of 600° C. or higher.

Advantageous Effects

The polyimide composition of the present disclosure can have a low thermal expansion coefficient and high heat resistance, and the polyamide acid used in the form of a polyamide acid varnish (one mode of polyamide acid composition) has good solubility.

DESCRIPTION OF EMBODIMENTS

Exemplary embodiments of the present disclosure will be described in detail as follows.
<Polyamide Acid Composition>

The polyamide acid composition of the present disclosure is a polyamide acid composition containing a polyamide acid obtained by polymerization of a tetracarboxylic acid compound containing NTCDA as an acid component and a specific diamine compound as a diamine component.

In the present disclosure, the diamine component used when the polyamide acid is polymerized includes aromatic diamine compounds having a rigid molecular skeleton such as PDA, OT, and TFMB, from the viewpoint that a polyimide to be formed can have a low thermal expansion coefficient and high heat resistance. Of these, PDA is essential, and at least one of OT and TFMB is essential. The reason for this is as follows.

When no PDA is included, the thermal expansion coefficient of the polyimide formed increases, and its thermal decomposition temperature decreases. When no OT and no TFMB are included, the varnish solubility of the polyamide acid obtained decreases.

Only one of OT and TFMB may be used, or both of them may be used.

The amount of PDA added is 75 to 95 mol % with respect to the total moles of the amine components. If the amount of PDA is less than the above percentage, the thermal expansion coefficient of the polyimide formed increases, and its thermal decomposition temperature decreases. If the amount of PDA is more than the above percentage, the varnish solubility of the polyamide acid obtained decreases.

The total amount of OT and TFMB added is 5 to 25 mol % with respect to the total moles of the amine components. If the total amount of OT and TFMB is less than the above percentage, the varnish solubility of the polyamide acid obtained decreases. If the amount is more than the above percentage, the thermal expansion coefficient of the polyimide formed increases, and its thermal decomposition temperature decreases.

In the present disclosure, examples of an acid component other than NTCDA used when the polyamide acid is polymerized include 3,3',4,4'-biphenyltetracarboxylic acid dianhydride (sBPDA), pyromellitic acid dianhydride (PMDA), 3,3',4,4'-benzophenonetetracarboxylic acid dianhydride (BTDA), oxydiphthalic acid dianhydride (ODPA), and alicyclic tetracarboxylic acid dianhydrides. However, the acid component other than NTCDA is not limited to these acid components, and these may be used alone or in combination of two or more. To obtain good varnish solubility and to allow the polyimide formed to have low thermal expansion and high heat resistance, it is preferable to use sBPDA.

The amount of sBPDA added is preferably more than 0 mol % and 50 mol % or less with respect to the total moles of the acid components. If the amount of sBPDA is more than the above percentage, the thermal expansion coefficient of the polyimide formed increases, and its thermal decomposition temperature decreases.

In this case, the amount of NTCDA added is 50 mol % or more and less than 100 mol % with respect to the total moles of the acid components. It the amount of NTCDA is less than the above percentage, the thermal expansion coefficient of the polyimide formed increases, and its thermal decomposition temperature decreases.

In one preferred embodiment of the present disclosure, the polyamide acid composition further contains a solvent. The solvent that can be contained in the polyamide acid composition of the present disclosure is preferably an aprotic polar solvent in terms of solubility. Examples of such a solvent include N,N-dimethylacetamide, N, N-dimethylformamide, N-methyl-2-pyrrolidone, hexamethylphosphoramide, dimethyl sulfoxide, γ-butyrolactone, and 1,3-dimethyl-2-imidazolidinone. However, no particular limitation is imposed on the solvent, so long as it can dissolve the polyamide acid composition. The above solvents may be used alone or as a mixture. When the solubility in the above solvent is low, the reaction solution may be heated to from 30° C. to 50° C. inclusive in order to increase the solubility.

In a varnish containing the polyamide acid composition of the present disclosure and the solvent, the polyamide acid composition is appropriately dissolved. When the solvent is volatilized or removed, the varnish is cured and can form a product such as a film or a tube. The varnish can be used as a polyimide precursor composition for screen printing.

Furthermore, a varnish containing the polyamide acid composition of the present disclosure and the solvent is coated on a metal foil and then dried to form a metal stacked body, and the metal stacked body can be widely used for IC devices etc.

No particular limitation is imposed on the method for producing the polyamide acid composition of the present disclosure, so long as the method includes polymerizing the tetracarboxyliic acid compound containing NTCDA as an acid component and the diamine component containing PDA and at least one of CT and TFMB at the above described specific ratio.

In one preferred embodiment, a solvent is further used when the polyamide acid composition of the present disclosure (the polyamide acid of the present disclosure) is produced. For example, the polyamide acid composition is obtained by adding about equimolar amounts of the acid component and the diamine component to the solvent, mixing them to obtain a mixture, and polymerizing the mixture. The mixture may contain additives described later, if necessary.

No particular limitation is imposed on the conditions of polymerization of the mixture. In one example of the production method, the diamine component and the tetracarboxylic acid compound are added to the solvent described above to obtain a mixture, and the mixture is stirred at an atmospheric pressure under the condition of room temperature to 50° C. to allow the mixture to react to produce a polyamide acid solution (polyamide acid composition).

Preferably, the polyamide acid (copolymerized polyamide acid) obtained by the above production method is prepared at a ratio (concentration) of 10 to 20% by mass in the solvent.

The polyamide acid composition of the present disclosure can be used as a varnish.

No particular limitation is imposed on the molecular structure of the polyamide acid (the polyamide acid of the present disclosure) contained in the polyamide acid composition of the present disclosure. The polyamide acid may be, for example, a random copolymer, an alternating copolymer, or a block copolymer.

The polyamide acid contained in the polyamide acid composition of the present disclosure may be used alone, or two or more types may be used in combination.

The polyamide acid composition of the present disclosure (the polyamide acid of the present disclosure) may further contain additives Examples of the additives include a dehydrator and a catalyst, and these are used to cyclize the polyamide acid to form a polyimide.

Examples of the dehydrator include aliphatic acid anhydrides such as acetic acid anhydride and aromatic acid anhydrides such as phthalic acid anhydride. These may be used alone or as a mixture.

Examples of the catalyst include: heterocyclic tertiary amines such as pyridine, picoline, quinoline, and imidazole; aliphatic tertiary amines such as triethylamine; and aromatic tertiary amines such as N,N-dimethylaniline. These may be used alone or as a mixture.

No particular limitation is imposed on the usage of the polyamide acid composition of the present disclosure. For example, a film can be formed by removing the solvent from the polyamide acid composition of the present disclosure and imidizing the resulting composition. No particular limitation is imposed on the method for forming the film.

In the method for forming the film, the film may be subjected to stretching operation to reduce the thermal expansion coefficient of the film and improve its isotropy. For example, to stretch the film, edges of the film are fixed during heat forming of the film, and the film is mechanically stretched.

A polyimide composition (polyimide) can be produced by curing the polyamide acid composition of the present disclosure (the polyamide acid of the present disclosure).

The polyimide composition of the present disclosure will next be described.

The polyimide composition of the present disclosure is a polyimide composition containing a polyimide obtained by polymerization of a tetracarboxylic acid compound containing NTCDA as an acid component and the specific diamine compound described above for the polyamide acid of the present disclosure and used as the diamine component.

The diamine component and the acid component used to produce the polyimide composition of the present disclosure are the same as those in the polyamide acid composition of the present disclosure.

The polyimide contained in the polyimide composition of the present disclosure corresponds to the polyimide of the present disclosure.

No particular limitation is imposed on the method for producing the polyimide composition of the present disclosure (the polyimide of the present disclosure), so long as the method includes polymerizing the tetracarboxylic acid compound containing NTCDA and the diamine component containing FDA and at least one of OT and TFMB at the above-described specific ratio.

For example, the acid component (tetracarboxylic acid component) and the diamine component (aromatic diamine component) are added to a solvent and mixed to obtain a mixture and the mixture is polymerized to obtain the polyimide composition.

The polyimide composition of the present disclosure (the polyimide of the present disclosure) may be produced by direct polymerization using the mixture or may be produced using the polyamide acid composition of the present invention or the polyamide acid of the present disclosure.

Examples of the method for imidizing the polyamide acid to form a polyimide include: a chemical cyclization method including dehydration using a dehydrator and a catalyst; and a thermal cyclization method including thermal dehydration. Any of these methods may be used.

The dehydrator and the catalyst used in the chemical cyclization method are the same as those described above.

The heating temperature in the thermal cyclization method can be freely selected within the range of normally 100 to 400° C., preferably 200 to 350° C., and more preferably 250 to 300° C. The heating time is normally 1 minute to 6 hours, preferably 5 minutes to 2 hours, and more preferably 15 minutes to 1 hour.

No particular limitation is imposed on the heating atmosphere. In terms of preventing coloration of the surface of the polyimide obtained by curing, an inert atmosphere such as a nitrogen atmosphere or a nitrogen/hydrogen mixed gas atmosphere is preferable.

A film of the polyimide composition (polyimide) can be produced by heating a film of the polyamide acid composition (polyamide acid) at high temperature, The removal of the solvent and the heating for imidization during the formation of the film using the polyamide acid composition may be performed continuously. The removal of the solvent and the imidization may be performed simultaneously.

No particular limitation is imposed on the molecular structure of the polyimide (the polyimide of the present disclosure) contained in the polyimide composition of the present disclosure. The polyimide may be, for example, a random copolymer, an alternating copolymer, or a block copolymer.

The polyimide contained in the polyimide composition of the present disclosure may be used alone, or two or more types may be used in combination.

The polyimide of the present disclosure has a low thermal expansion coefficient of 10 ppm/° C. or lower.

The thermal expansion coefficient can be measured by a method described later.

The polyimide of the present disclosure has high heat resistance and a thermal decomposition temperature of 600° C. or higher.

The thermal decomposition temperature can be measured by a method described later.

EXAMPLES

The present disclosure will be specifically described by way of exemplary Examples. However, the present disclosure is not limited to these exemplary Examples.

The details of the following components are as follows.
PDA: p-phenylenediamine
OT: o-tolidine
TFMB: 2,2'-bis(trifluoromethyl)benzidine
NTCDA: 2,3,6,7-naphthalenetetracarboxylic acid dianhydride
sBPDA: 3,3',4,4'-biphenyltetracarboxylic acid dianhydride <Evaluation>

Mechanical properties were evaluated by the following methods. The results are shown in Tables.
(Thermal Expansion Coefficient)
Measurement device TMA-60, Shimadzu Corporation
Temperature range 50° C. to 200° C.
Heating rate: 10° C./min
(Thermal Decomposition Temperature)
Measurement device DTG-60, Shimadzu Corporation
Heating rate; 10° C./min
Thermal decomposition temperature: Temperature at which the loss of weight in a measurement chart is 5%.
(Varnish Solubility)

A precipitate, an insoluble component, and gelation in the varnish were checked visually. "A," "B," and "C" in Tables mean as follows.

A: After completion of the polymerization of the varnish (solid content: 20 wt %), no precipitate and no gelation were found. Even after long-term storage (one month), no precipitate, no gelation, and no thickening were found.

B: After completion of the polymerization of the varnish (solid content: 20 wt %), no precipitation and no gelation were found. After long-term storage (one month), precipitation, gelation, or thickening was found.

C: After completion of the polymerization of the varnish (solid content 20 wt %), precipitation and gelation were found.

Example 1

51 g of PDA, 8 g of TFMB, 67 g of NTCDA, and 73 g of sBPDA were added to 850 g of N,N-dimethylacetamide (DMAc), and the mixture was stirred and allowed to react at room temperature and an atmospheric pressure for 3 hours to obtain a polyamide acid solution (polyamide acid composition).

15 g of the polyamide acid solution obtained was applied to a glass plate using a bar coater and heat-cured at 100° C. for 20 minutes, 200° C. for 20 minutes, 300° C. for 20 minutes, and 400° C. for 20 minutes to thereby obtain a polyimide film with a thickness of about 50 nm.

The film obtained was subjected to characteristic evaluation tests, and the results are shown in Table 1. The molar ratio of each component is a molar ratio with respect to the total moles of the aromatic diamine components or the total moles of the tetracarboxylic acid components.

Example 2 to 6

Polyamide acids and polyimide films were produced following the same procedure as in Example 1 using aromatic diamine components and tetracarboxylic acid components at molar ratios shown in Table 1 and subjected to characteristic evaluation tests. The results are shown in Table 1.

Comparative Example 1 to 9

Polyamide acids and polyimide films were produced following the same procedure as in Example 1 using aromatic diamine components and tetracarboxylic acid components at molar ratios shown in Table 2 and subjected to characteristic evaluation tests. The results are shown in Table 2.

TABLE 1

|  |  | Example 1 | Example 2 | Example 3 | Example 4 | Example 5 | Example 6 |
|---|---|---|---|---|---|---|---|
| Molar ratio of monomers | NTCDA | 0.50 | 0.50 | 0.50 | 0.50 | 1.00 | 1.00 |
|  | sBPDA | 0.50 | 0.50 | 0.50 | 0.50 | — | — |
|  | PDA | 0.95 | 0.95 | 0.75 | 0.75 | 0.75 | 0.75 |
|  | OT | 0.05 | — | 0.25 | — | 0.25 | — |
|  | TFMB | — | 0.05 | — | 0.25 | — | 0.25 |
| Thermal expansion coefficient [ppm] |  | 7.0 | 6.0 | 10.0 | 10.0 | 8.0 | 7.0 |
| Thermal decomposition temperature [°C.] |  | 603 | 602 | 601 | 600 | 601 | 600 |
| Varnish solubility |  | A | A | A | A | A | A |

TABLE 2

|  |  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
|---|---|---|---|---|---|---|---|---|---|---|
| Molar ratio of monomers | NTCDA | — | 0.10 | 1.00 | 1.00 | 0.50 | 0.25 | 1.00 | 1.00 | 1.00 |
|  | sBPDA | 1.00 | 0.90 | — | — | 0.50 | 0.75 | — | — | — |
|  | PDA | 1.00 | 1.00 | 0.50 | 0.50 | 1.00 | 1.00 | 1.00 | 0.97 | 0.97 |
|  | OT | — | — | 0.50 | — | — | — | — | 0.03 | — |
|  | TFMB | — | — | — | 0.50 | — | — | — | — | 0.03 |
| Thermal expansion coefficient [ppm] |  | 18.0 | 15.0 | 12.0 | 11.0 | 3.5 | 8.5 | — | — | — |
| Thermal decomposition temperature [° C.] |  | 595 | 597 | 599 | 598 | 607 | 603 | — | — | — |
| Varnish solubility |  | A | A | A | A | B | B | C | C | C |

As is clear from the results shown in the above tables, in a PDA-sBPDA-based polyimide containing no NTCDA (Comparative Example 1), a polyimide containing only a small amount of NTCDA as an acid component and containing no OT and no TFMB as amine components (Comparative Example 2), and polyimides containing NTCDA as an acid component and containing only a small amount of PDA as an amine component (Comparative Examples 3 and 4), the thermal expansion coefficient is high (more than 10 ppm/° C.), and the thermal decomposition temperature is low (lower than 600° C.). In polyimides containing NTCDA as an acid component but containing no OT and no TFMB as amine components or only a small amount of OT or TFMB (Comparative Examples 5 to 9), the thermal expansion coefficient is low (10 ppm/° C. or lower), and the thermal decomposition temperature is high (600° C. or higher), but the varnish solubility is poor.

In polyimides containing NTCDA as an acid component and containing PDA and at least one of OT and TFMB at the above-described specific ratio as amine components (Examples 1 to 6), the thermal expansion coefficient is low, and the thermal decomposition temperature is high (600° C. or higher). Moreover, the varnish solubility is good.

INDUSTRIAL APPLICABILITY

The polyamide acid composition of the present disclosure has good varnish solubility. A polyimide composition obtained by curing the polyamide acid composition of the present disclosure has a low thermal expansion coefficient (10 ppm/° C. or lower) and a high thermal decomposition temperature (600° C. or higher) Polyimide materials obtained using the present disclosure are expected to be effectively used for applications that require thermal dimensional stability and heat resistance equal to or higher than those of conventional polyimide materials (e.g., semiconductor materials and thin-film solar cell materials).

The invention claimed is:

1. A polyamide acid composition comprising:
   a polyamide acid obtained by polymerization of:
      a tetracarboxylic acid component containing: (i) 50 mol % of 2,3,6,7-naphthalenetetracarboxylic acid dianhydride, and (ii) 50 mol % of 3,3',4,4'-biphenyltetracarboxylic acid dianhydride, and
      a diamine component containing 95 to 75 mol % of p-phenylenediamine and 5 to 25 mol % of o-tolidine and/or 2,2'-bis(trifluoromethyl)benzidine.

2. A polyamide acid obtained by polymerization of:
   a tetracarboxylic acid component containing: (i) 50 mol % of 2,3,6,7-naphthalenetetracarboxylic acid dianhydride, and (ii) 50 mol % of 3,3',4,4'-biphenyltetracarboxylic acid dianhydride, and
   a diamine component containing 95 to 75 mol % of p-phenylenediamine and 5 to 25 mol % of o-tolidine and/or 2,2'-bis(trifluoromethyl)benzidine.

3. A polyimide composition comprising:
   a polyamide acid obtained by polymerization of:
      a tetracarboxylic acid component containing: (i) 50 mol % of 2,3,6,7-naphthalenetetracarboxylic acid dianhydride, and (ii) 50 mol % of 3,3',4,4'-biphenyltetracarboxylic acid dianhydride, and
      a diamine component containing 95 to 75 mol % of p-phenylenediamine and 5 to 25 mol % of o-tolidine and/or 2,2'-bis(trifluoromethyl)benzidine.

4. A polyimide obtained by polymerization of:
   a tetracarboxylic acid component containing: (i) 50 mol % of 2,3,6,7-naphthalenetetracarboxylic acid dianhydride, and (ii) 50 mol % of 3,3',4,4'-biphenyltetracarboxylic acid dianhydride, and
   a diamine component containing 95 to 75 mol % of p-phenylenediamine and 5 to 25 mol % of o-tolidine and/or 2,2'-bis(trifluoromethyl)benzidine.

5. The polyimide according to claim 4, wherein the polyimide has a thermal expansion coefficient of 10 ppm/° C. or less.

6. The polyimide according to claim 4, wherein the polyimide has a 5% thermal weight loss temperature of 600° C. or higher.

7. The polyimide according to claim 5, wherein the polyimide has a 5% thermal weight loss temperature of 600° C. or higher.

8. The polyamide acid composition according to claim 1, wherein the diamine component contains 5 to 25 mol % of 2,2'-bis(trifluoromethyl)benzidine.

9. The polyamide acid according to claim 2, wherein the diamine component contains 5 to 25 mol % of 2,2'-bis(trifluoromethyl)benzidine.

10. The polyimide composition according to claim 3, wherein the diamine component contains 5 to 25 mol % of 2,2'-bis(trifluoromethyl)benzidine.

11. The polyimide according to claim 4, wherein the diamine component contains 5 to 25 mol % of 2,2'-bis(trifluoromethyl)benzidine.

* * * * *